UNITED STATES PATENT OFFICE.

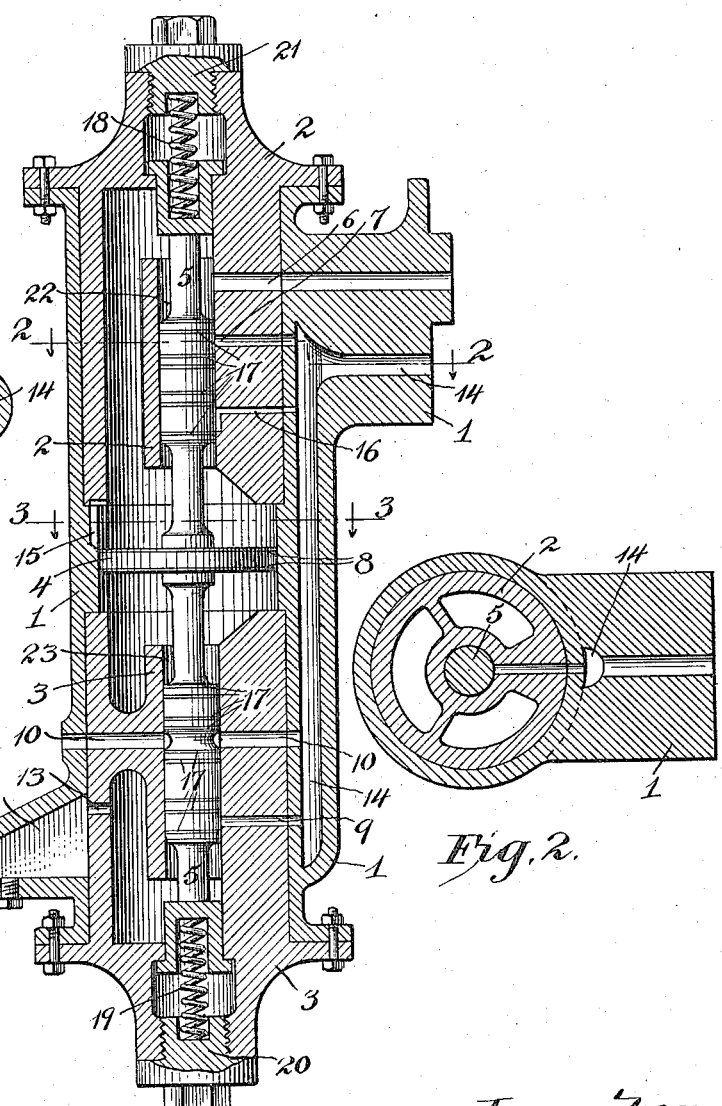

JOHN A. ADAMS, OF NOGALES, ARIZONA.

COMBINED AUTOMATIC AND STRAIGHT AIR VALVE MECHANISM.

1,152,258. Specification of Letters Patent. Patented Aug. 31, 1915.

Application filed January 21, 1915. Serial No. 3,441.

*To all whom it may concern:*

Be it known that I, JOHN A. ADAMS, a citizen of the United States, residing at Nogales, in the county of Santa Cruz and State of Arizona, have invented new and useful Improvements in Combined Automatic and Straight Air Valve Mechanism, of which the following is a specification.

This invention relates in general to fluid pressure brakes, such as are usually operated by compressed air, and more especially to a combined automatic and straight air brake controlling valve designed for use on locomotives and cars, and adapted to be operated either automatically by reduction in the train brake pipe pressure and using the auxiliary reservoir reserve air in the usual way, or by increasing the normal train brake pipe pressure and using straight air from the main reservoir on the locomotive direct to the brake cylinder, and it consists in the combinations, constructions and arrangements herein described and claimed.

One of the objects of my invention is to provide an improved combined automatic and straight air valve mechanism for setting the brakes, either by reducing or increasing the normal train brake pipe pressure through the engineer's brake valve.

Another object of my invention is to provide an improved apparatus of the type described, whereby the brakes may be applied and released or controlled at will, either by the use of automatic or straight air, regardless of the weight or tonnage of a car or the different train brake pipe pressures.

Other objects and advantages will appear in the following specification and the novel features of the device will be particularly pointed out in the appended claims.

My invention is illustrated in the accompanying drawing forming part of this application in which—

Figure 1 is a view showing the central vertical section through the device; Fig. 2 is a cross section view along the line 2—2 of Fig. 1; Fig. 3 is a cross section view along the line 3—3 of Fig. 1.

In the following specification I will describe completely the novel combined automatic and straight air valve mechanism and the operation thereof, and only so much of the ordinary air brake mechanism which coöperates therewith as will be sufficient for a clear understanding of the use and operation of my invention.

In carrying out my invention I provide a valve casing 1 of suitable shape. In the present instance I have shown this as a cylinder provided at its upper end with a cap 2 and at its lower end with a cap 3 which may be secured to the body portion in any suitable manner.

Within the interior of the valve casing is a piston valve 4 designed to operate the piston valve rod 5, which controls the auxiliary reservoir air pressure in the upper part of the cylinder coming through passage 6 and arranged to cover a port 7 leading direct to the brake cylinder. Packing rings 8 are provided for the piston valve. The lower end of piston valve rod is designed to control a port 9 and an exhaust port 10. Packing rings 17 are provided for the piston valve rod. A passage 14 is arranged in the wall of casing 1 and connected directly to the brake cylinder for the purpose of allowing the auxiliary reservoir air pressure coming through passage 6 and port 7 to pass direct to the brake cylinder for an automatic application of the brakes when the normal train brake pipe air pressure is reduced in the usual way, and permits of a straight air application, when the normal train brake pipe pressure is increased, which forces the valve to cover the exhaust port 10 and uncover the port 9, the air passing from the train brake pipe through pipe 11 into the cavity 12 and through passage 13 to the lower end of cylinder where it is delivered through port 9 into passage 14 direct to the brake cylinder.

A seepage groove 15 connects the upper and lower portions of the cylinder in the piston cylinder cavity for the purpose of keeping the auxiliary reservoir charged. At 16 is shown a port which allows the excess air pressure entering the auxiliary reservoir through seepage groove 15, when a straight air application is made by increasing the train brake pipe pressure, to pass on to the brake cylinder, thereby preventing any overcharge of air pressure in the auxiliary reservoir which may be caused by increasing the train brake pipe pressure for a straight air application of the brakes. At 18 in the upper cylinder cap and 19 in the lower cylinder cap are shown two springs, which are provided for the purpose of moving the piston valve 20 to its normal position when the train brake pipe and auxiliary reservoir air pressures have equalized through the seepage groove 15. Plug 20 in the lower cylinder cap and plug 21 in the upper cylinder cap are provided for closing the spring cavities.

In the upper cylinder cap 2 is shown a cylindrical bore 22 in which the piston valve rod 5 is operated to control the auxiliary reservoir air pressure by the movement of the piston valve for an automatic application of the brakes. In the lower cylinder cap 3 is shown a cylindrical bore 23 in which the piston valve rod 5 is operated to control exhaust port 10 and train brake pipe pressure by the movement of the piston valve for a straight air application of the brakes. It will thus be seen that any increase in the train brake pipe pressure above normal will move the piston valve 4 to its upper position and cause the piston valve rod 5 to cover the exhaust port 10 and uncover the port 9 in the cylindrical bore 23, admitting the straight air direct to the brake cylinder through the passage 14.

From the foregoing description of the various parts of the device, the operation thereof may be readily understood.

To make an automatic service or emergency brake application with my combined automatic and straight air valve, the engineer makes a reduction in the normal train brake pipe air pressure in the usual way through the engineer's valve, this permits the release of the air on the lower side of the piston valve 4 through passage 13, cavity 12 and pipe 11 to the train brake pipe, the auxiliary reservoir air pressure then forces piston valve 4 to its lower position, the piston valve rod 5 then covers the exhaust port 10 in the cylindrical bore 23 and uncovers the port 7 in the cylindrical bore 22, the auxiliary reservoir air pressure then flows through passage 14 direct to the brake cylinder which makes an automatic application of the brakes, the force of the application being controlled by the amount of reduction made through the engineer's brake valve.

To release the automatic application of the brakes, the engineer re-charges the train brake pipe, which forces the piston 4 to its upper position where it uncovers the seepage groove 15 and allows the air to pass through the upper cylinder and on through passage 6 to the auxiliary reservoir, when the air pressure is again equalized on both sides of the piston valve 4 the spring 18 forces it to its normal position and uncovers the exhaust port 10 through cylindrical bore 23 releasing the air from brake cylinder to the atmosphere, thus releasing the brakes.

To make a straight air service or emergency brake application with my combined automatic and straight air valve, the engineer increases the normal train brake pipe pressure, pipe 11 being connected directly to the train brake pipe, air passes from the train brake pipe through cavity 12 and passage 13 into lower end of piston valve cylinder, where it forces the piston valve 4 to its upper position, the piston valve rod 5 then covers the exhaust port 10 and uncovers the port 9 in cylindrical bore 23 which permits the air to flow into passage 14 and on to the brake cylinder, thereby setting or applying the brakes.

The amount of increased air pressure added to the normal train brake pipe pressure as above described, to set the brake with my combined automatic and straight air valve, also keeps the auxiliary reservoir charged through the seepage groove 15 where it flows through the upper cylinder cavity into passage 6 and on to the auxiliary reservoir. The port 16 is arranged in the cylindrical bore 22 to drain the excess air pressure accumulated in the auxiliary reservoir when making a straight air brake application and is covered when the air pressure equalizes on both sides of the piston valve 4, the spring 18 moving the valve to its normal position covers the port 9 and uncovers the exhaust port 10 in the cylindrical bore 23 when train brake pipe air pressure is reduced to normal through the engineer's valve, this permits the release of the air from the brake cylinder to the atmosphere, thus releasing the brakes.

It will thus be seen that it depends entirely on the amount of increased air pressure which the engineer adds to the normal train brake pipe pressure how hard the brakes are applied, as he has complete control and can make either an automatic or straight air service or emergency application of the brakes at will, by the use of the engineer's brake valve on the engine. By the use of my valve it is impossible to loose the braking power, since any position, other than running or lap positions of the engineer's brake valve will apply the brakes.

By the use of my valve, the brakes can be applied by both the use of straight air and automatic air. Straight air can be applied to the brakes and automatic air can be applied on top, or automatic air can be applied to the brakes and straight air can be applied on top, but with my valve it is better to use straight air in all cases, thereby having the automatic air in reserve in case of accident, such as the parting of a hose connection or the breaking of a train brake pipe. As is clearly seen, the auxiliary reservoir is kept charged by the use of my valve.

By the use of my valve using straight air, the pressure in each brake cylinder will be the same, whether the cylinder piston is set to travel five inches or ten inches, for the reason that the increased air pressure applied to the normal train brake pipe pressure at the engine, is equally distributed through my valve to the brake cylinders. This prevents to a large extent, the parting or breaking in two of the train, as is now very often the case with the present system of automatic brakes. My valve will act perfectly, regardless of the weight or tonnage of a car or the different train brake pipe pressures, and permits of a gradual control by using either automatic or straight air for a brake application.

Having now described my invention, what I claim as new and desire to secure by Letters Patent is:—

1. In an air brake system, a combined automatic and straight air valve mechanism for controlling the brakes, comprising a casing provided with a main piston valve chamber, a piston valve disposed in said chamber, packing rings for said piston valve, a piston valve rod extending through said piston valve to govern the brake application by the manipulation of the engineer's brake valve, packing rings for said piston valve rod, a passage for establishing communication between said main piston valve chamber and the auxiliary reservoir, a seepage groove in the wall of the casing around said piston valve when the latter is in its upper position, a pipe for connecting the lower end of said valve casing with a supply of compressed air, a passage in the wall of the casing connecting the upper and lower ends of the main piston valve chamber with the brake cylinder and means for establishing communication between the auxiliary reservoir and the brake cylinder.

2. In an air brake system, a combined automatic and straight air valve mechanism for controlling the brakes, comprising a casing provided with a main piston valve chamber, a piston valve disposed in said chamber, packing rings for said piston valve, a piston valve rod extending through said piston valve to govern the brake application by the manipulation of the engineer's brake valve, packing rings for said piston valve rod, a passage for establishing communication between said main piston valve chamber and the auxiliary reservoir, a seepage groove in the wall of the casing around said piston valve when the latter is in its upper position, a pipe for connecting the lower end of said valve casing with a supply of compressed air, a passage in the wall of the casing connecting the upper and lower ends of the main piston valve chamber with the brake cylinder and means for establishing communication between the auxiliary reservoir and the brake cylinder, said means comprising an upper cylinder cap provided with a cylindrical bore in which the upper end of the piston valve rod operates, an upper passage connecting said cylindrical bore with the passage leading to the brake cylinder, said passage being normally covered and adapted to be uncovered by the movement of the piston valve when a reduction of air pressure is made in the pipe connecting with the lower end of valve casing, a passage in the lower end of the cylindrical bore of said upper cylinder cap connecting said cylindrical bore with the passage leading to the brake cylinder, said passage being normally covered and adapted to be uncovered by an increase of air pressure in the pipe connecting the lower end of valve casing with a supply of compressed air, and means for controlling the exhaust port and establishing communication between the lower end of the main piston valve chamber and the passage connecting with the brake cylinder for a straight air application of the brakes.

3. In an air brake system, a combined automatic and straight air valve mechanism for controlling the brakes, comprising a casing provided with a main piston valve chamber, a piston valve disposed in said chamber, packing rings for said piston valve, a piston valve rod extending through said piston valve to govern the brake application by the manipulation of the engineer's brake valve, packing rings for said piston valve rod, a passage for establishing communication between said main piston valve chamber and the auxiliary reservoir, a seepage groove in the wall of the casing around said piston valve when the latter is in its upper position, a pipe for connecting the lower end of said valve casing with a supply of compressed air, a passage in the wall of the casing connecting the upper and lower ends of the main piston valve chamber with the brake cylinder and means for establishing communication between the auxiliary reservoir and the brake cylinder, said means comprising an upper cylinder cap provided with a cylindrical bore in which the upper end of the piston valve rod operates, an upper passage connecting said cylindrical bore with the passage leading to the brake cylinder, said passage being normally covered and adapted to be uncovered by the movement of the piston valve when a reduction of air pressure is made in the pipe connecting with the lower end of valve casing, a passage in the lower end of the cylindrical bore of said upper cylinder cap connecting said cylindrical bore with the passage leading to the brake cylinder, said passage being normally covered and adapted to be uncovered by an increase of air pressure in the pipe connecting the lower end of valve casing with a supply of compressed air, and means for controlling the exhaust port and establishing communication between the lower end of the main piston valve chamber and the passage connecting with the brake cylinder for a straight air application of the brakes, said means comprising a lower cylinder cap provided with a cylindrical bore in which the lower end of piston valve rod operates, a passage connecting said cylindrical bore with the passage leading to the brake cylinder, said passage being normally closed and adapted to be uncovered by the movement of the piston valve when an increase of air pressure is made in the pipe connecting with the lower end of the valve casing, an exhaust port through the lower cylinder cap cylindrical bore connecting the passage leading from the brake cylinder to the atmosphere normally uncovered and adapted to be covered by the movement of the piston valve, by either increasing the air pressure in the lower end of the main piston valve chamber when making a straight air application of the brakes or reducing the air pressure when making an automatic application, springs arranged in the upper and lower cylinder caps for moving the piston valve to its normal position when the air pressure is equalized in the upper and lower ends of the main piston valve chamber and plugs for closing the said spring cavities in the upper and lower cylinder caps.

In testimony whereof I affix my signature in the presence of two witnesses.

JOHN A. ADAMS.

Witnesses:
D. T. SCHETTER,
A. N. MITCHELL.

Copies of this patent may be obtained for five cents each, by addressing the "Commissioner of Patents, Washington, D. C."